Figure 1:
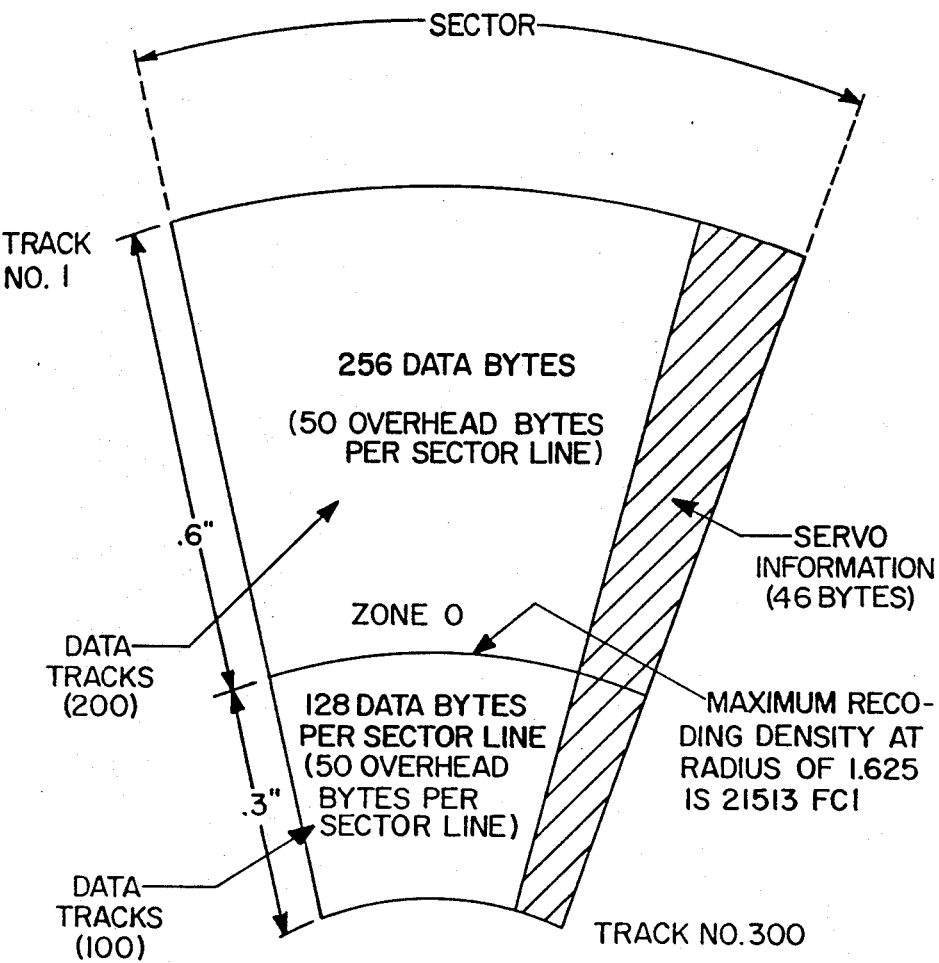

United States Patent [19]

Bizjak

[11] Patent Number: 4,714,967
[45] Date of Patent: Dec. 22, 1987

[54] BINARILY RELATED VARIABLE RATE RECORDER

[75] Inventor: John F. Bizjak, Porto Alegre, Calif.

[73] Assignee: Eastman Kodak Company, Rochester, N.Y.

[21] Appl. No.: 798,043

[22] Filed: Nov. 14, 1985

[51] Int. Cl.$^4$ ............................................. G11B 5/09
[52] U.S. Cl. ............................................. 360/48; 360/49
[58] Field of Search ........................ 360/48, 49, 51, 40

[56] References Cited

U.S. PATENT DOCUMENTS

| | | | |
|---|---|---|---|
| 4,016,603 | 4/1977 | Ottesen | 360/135 |
| 4,161,753 | 7/1979 | Bailey et al. | 358/128 |
| 4,422,110 | 12/1983 | Reynolds | 360/69 |
| 4,514,771 | 4/1985 | Stark et al. | 360/73 |

FOREIGN PATENT DOCUMENTS

84/04990  12/1984  World Int. Prop. O.

OTHER PUBLICATIONS

"Disc File Memories", by H. J. McLaughlin, Instruments & Control Systems, vol. 34, 11/83.
Patents Abstracts of Japan, vol. 2, No. 125, 10/20/78, p. 7477 E 78.
Patents Abstracts of Japan, vol. 8, No. 271, 12/12/84.

Primary Examiner—Vincent P. Canney
Attorney, Agent, or Firm—Robert F. Cody

[57] ABSTRACT

Data is so recorded in tracks of a first radially disposed zone of a disc that the minimum bit length limit is not exceeded within the innermost track of the zone and, in another more inwardly radially disposed record zone (or zones) of the disc, the quantity of data recorded in the tracks thereof is binarily reduced so as again not to exceed the minimum bit length limit within the innermost track of the second zone, etc.

3 Claims, 6 Drawing Figures

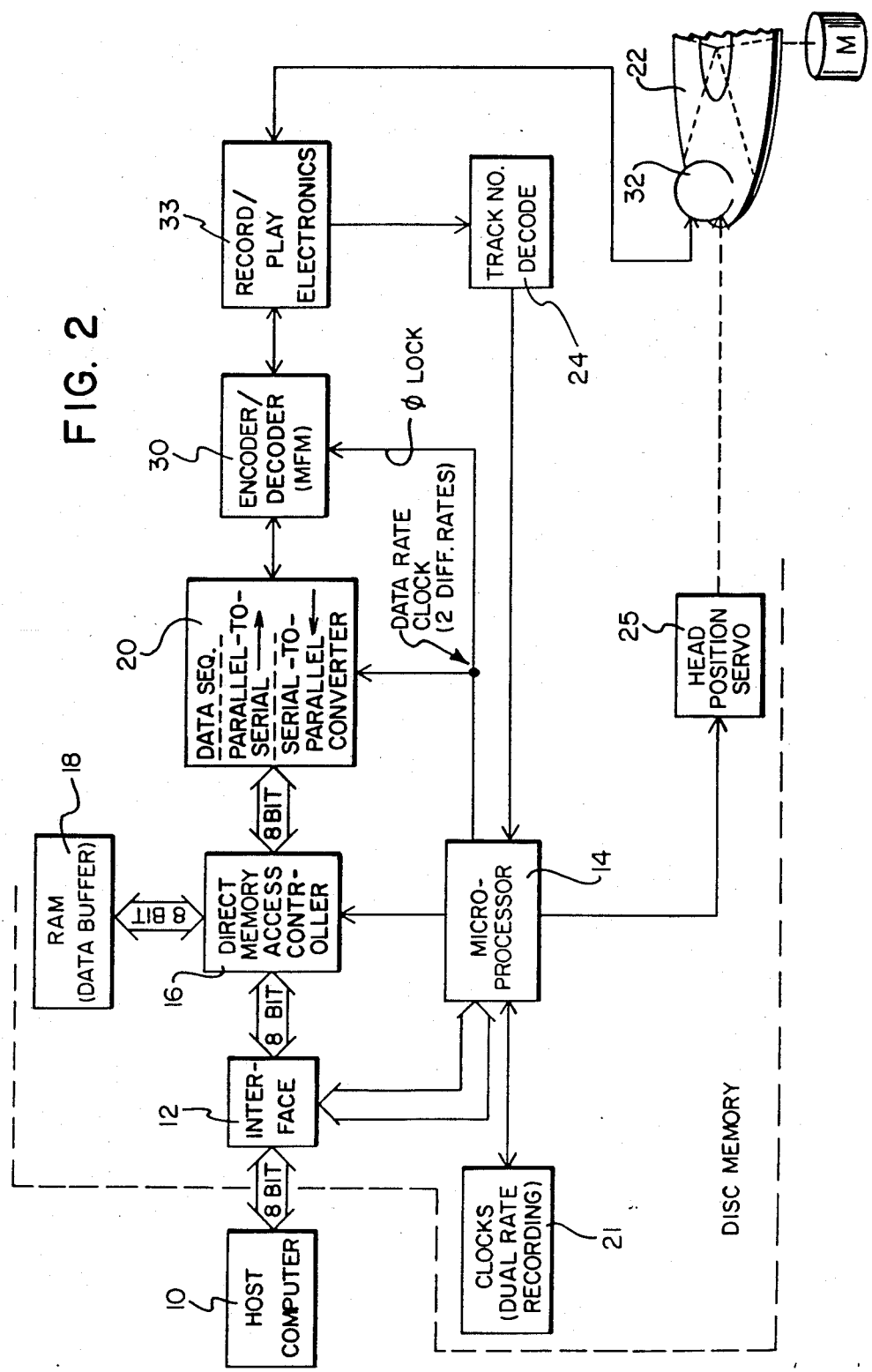

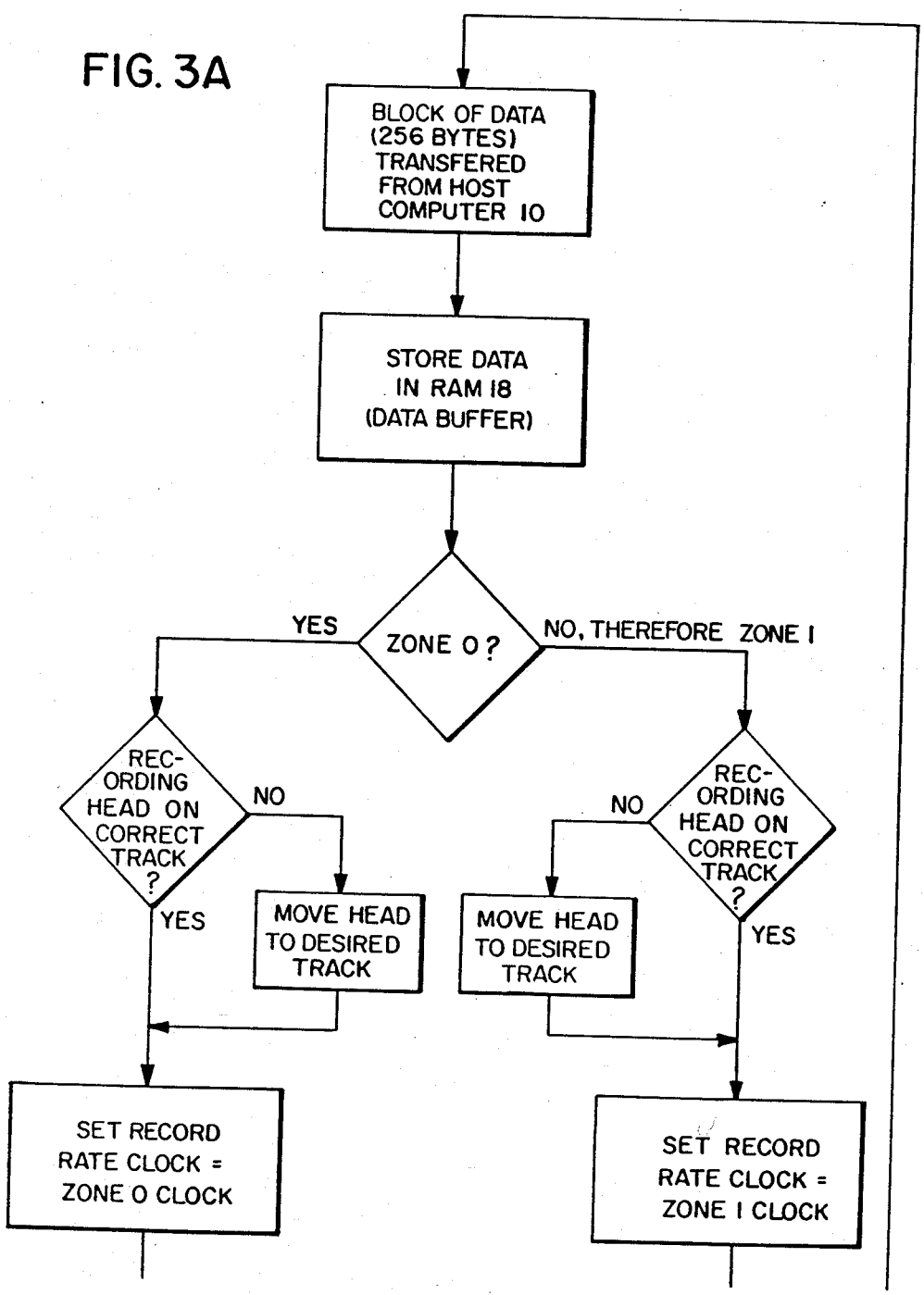

BINARILY RELATED VARIABLE RATE RECORDER

BACKGROUND OF THE INVENTION

1. Field of the Invention

This invention relates in general to magnetic recording and more particularly to apparatus/techniques for maximizing the storage capability of computer discs, especially floppy discs such as the now ubiquitous 5¼ inch floppy discs used in connection with the computer arts. By and large, state of the art floppy discs store about 0.5 megabytes of data.

2. Description Relative to the Prior Art

The packing density of data recorded on a magnetic medium is dependent to a large extent on the coercivity of the medium. Too low a coercivity allows demagnetization effects to alter closely packed recorded information, thereby rendering the information useless. For a medium of a certain coercivity, therefore, there is a minimum flux change length (fcl) that the medium will reliably support . . . which is to say that there is a maximum numer of data representative flux changes per inch (fci) that such a medium will permit.

In the interest of facilitating the teaching of the invention, a particular (representative) disc product, as well as the source of its otherwise attendant limited capacity, will now be discussed:

Given a 5¼ inch floppy disc, the information stored thereon being distributed among pie-shaped sectors (e.g. 78 in number), and the disc medium being coercivity-wise capable of supporting minimum bit lengths* of no less than, say, $$\frac{1}{21513} \text{ inches} = 0.000046 \text{ inches},$$

an initial concern is: "What is the minimum disc radius $R_{min}$ that will be capable of recording bit lengths as little as 0.000046 inches?"

*"Bit length" as used herein is synonymous with flux change length", i.e. the maximum fci for the medium in question=21513.

$$R_{min} = \frac{\frac{Bytes^{**}}{Sector} \times \frac{Bits}{Bytes} \times Bit\ Length_{(min)} \times Number\ of\ Sectors}{2\pi}$$

$$= \frac{352 \times 8 \times .000046'' \times 78}{2\pi}$$

$$R_{min} = 1.61''$$

**In the disc in question, there are 256 data bytes, 50 overhead bytes, and 46 embedded servo bytes per sector, each byte being comprised of 8 bits per.

Since the disc in question has an overall radius of 2.625", this leaves just one radial inch within which recording might be made.

Assuming that a peripheral band about four tenths of a radial inch is needed to effect good head-to-media interface at the outer regions of the disc, recording is limited to a region of only 0.6 radial inches. With the medium capable of recording, say, 333 tracks per inch, the disc, structured as described above, is thus limited to 200 effective recording tracks, i.e.

$$333 \times 0.6 = 200$$

The per-side data storage capacity $C_s$ of the disc so described is therefore:

$$C_s = Number\ of\ Tracks \times \frac{Data\ Bytes}{Sector} \times Number\ of\ Sectors$$

$$C_s = 200 \times 256 \times 78$$

$$C_s = 4\ megabytes$$

By recording on both disc sides, the total capacity $C_{2s}$ increases to 8 megabytes.

SUMMARY OF THE INVENTION

It is highly desirable in computer applications that data be presented/handled in discrete blocks, typically involving the radix 2 (i.e., $256 = 2^8$). By halving the per sector data in the aforementioned disc to 128 (i.e., $2^7$), about 100 additional tracks may be utilized before the bit length to be recorded reaches the limit (0.000046") associated with the shortest bit length that the medium in question is capable of recording, albeit that, in connection with each of the additional 100 tracks (disc Zone 1), it takes 2 sector tracks to compose a block of 256 bytes, whereas for each of the first 200 tracks (disc Zone 0), it takes only 1 sector track to provide a block of 256 bytes:

For Zone 1, at track 200+100=300:

$$R = 1.625'' - \frac{100''}{333}$$

$$R = 1.292''$$

The bit length within track 300, therefore, is $$Bit\ length = \frac{2\pi R}{\frac{Bits}{Sector} \times Number\ of\ Sectors}$$

$$= \frac{2\pi\ 1.292}{8(128 + 50 + 46) \times 78}$$

$$Bit\ length = 0.000058''$$

This bit length, it will be appreciated, is larger than the shortest recordable bit length (0.000046") that occurred in track 200, and evidences that recording between tracks 200 and 300 is, indeed, effective. Attendantly, as will be demonstrated below, the disc in question will be capable of storing two additional megabytes of data (one additional megabyte for each disc side), for a new total data storage capacity $C_{Total}$ of 10 megabytes:

No. of Tracks (Zone 1) $\times \frac{Data\ Bytes}{Sector} \times$ No. of Sectors $\times$ No. of Disc Sides = $C_{2s\ (Zone\ 1)}$ $$100 \times 128 \times 78 \times 2 = C_{2s\ (Zone\ 1)}$$

$$2\ megabytes = C_{2s\ (Zone\ 1)}$$

$$C_{Total} = C_{2s\ (Zone\ 0)} + C_{2s\ (Zone\ 1)}$$

$$= 8\ megabytes + 2\ megabytes$$

$$C_{Total} = 10\ megabytes$$

Characteristic of the invention, therefore, is the following:

Data is so recorded in tracks of a first radially disposed zone of a disc that the minimum bit length limit is not exceeded within the innermost track of the zone and, in another more inwardly radially disposed record zone (or zones) of the disc, the quantity of data recorded in the tracks thereof is binarily reduced so as again not to exceed the minimum bit length limit within the innermost track of the second zone, etc.

The invention will now be described with reference to the Figures, of which

FIG. 1 is a schematic diagram of a sector of a computer disc which is organized pursuant to the invention, FIG. 2 is a schematic block diagram of apparatus adapted for cooperation with discs of the type indicated in FIG. 1, and FIGS. 3A/3B and 4A/4B are logic flow diagrams illustrating the algorithm employed in association with the apparatus of FIG. 2.

Before discussing apparatus adapted to operate pursuant to the invention, however, it is considered appropriate first to expand on the discussion above as to a typical format for a disc according to the invention: Referring therefore to FIG. 1, one of 78 like sectors of a computer disc comprises two data recording zones: Zone 0 and Zone 1. Each sector Zone 0 is adapted to record 256 data bytes per track, of which there are 200. By contrast, each sector Zone 1 is comprised of 100 tracks per, and records data in binarily-reduced blocks of 128 bytes per track. Insofar as the Zone 1 data is concerned, therefore, it takes two Zone 1 sector tracks to compose the equivalent of a Zone 0 recording of 256 bytes. By binarily reducing the amount of data bytes from zone-to-zone, easy data processing is provided: blocks of Zone 0 data are processed as full data blocks, whereas (easily handled) discrete half-blocks of Zone 1 data are paired to form corresponding full data blocks. (While only two sector zones are depicted in FIG. 1, it will be appreciated that the invention allows for, say, a third data storage zone to be radially formed closer to the disc center, the data thereof being again binarily reduced to 64 data bytes per track, with the requirement for easy processing now being that four quarter-blocks combine to form a full data block, etc.). Whether at the limit of Zone 0 (track 200) . . . or at the limit of Zone 1 (track 300) . . . the minimal bit length (0.000046 inches) for the medium in question is not exceeded (i.e., bit lengths shorter than 0.000046 inches are not recorded in either track 200 or 300), as discussed above.

Forming part of each disc sector is pre-recorded servo information. The servo information provides, among other things, 1. tracking control to allow a record/play head to follow the "zoned" data tracks (and which control forms no part of the present invention), and 2. track number information for operating clocks and other data flow controls necessary to the working of the invention.

With the above as background, reference should now be had to the disc memory of FIG. 2, which depicts an assemblage of known components specially arranged to effect data recording and processing pursuant to the invention: A host computer 10, the input and output of which is in the form of a standard 8-bit message, is connected to the disc memory via an interface device 12, of any well known form. Data is transferred between the host computer 10 and the disc memory in blocks of 256 bytes apiece, such data being transferred at the data rate of the host computer, and under control of an algorithm embodied in a microprocessor 14.

The microprocessor employed herewith may take the form of a Model Z-8 microprocessor, available from Zilog, Inc. of Campbell, Calif. The microprocessor 14 operates a direct memory access controller 16 (e.g., a DTC Model 1506, available from Data Technology Corp., of Santa Clara, Calif.) which regulates data traffic to and from a data buffer random access memory (RAM) 18. Data is processed to and from the data buffer RAM 18 in either full- or half-blocks, the direct memory access controller 16, for example, timing the flow of data from the host computer 10 into the RAM 18 . . . or from the RAM 18 to the host computer 10 . . . or between the RAM 18 and a data sequencer-parallel-to-serial/serial-to-parallel converter 20. The data sequencer employed in connection with this presently preferred form of the invention utilizes an DTC Model 1505 sequencer, available from Data Technology Corp., of Santa Clara, Calif.; and operates at either one or another of two clock rates (21) depending on whether data is processed to/from a Zone 0 sector, or to/from Zone 1 sectors, of a disc 22. For Zone 0, the data rate clock is different than that employed for Zone 1. The serial data output of the data sequencer 20 is applied to an encoder/decoder 30, typically employing modified frequency modulation (MFM) coding, wherein a ONE, for example, calls for a frequency transition, and a ZERO does not, except in the event a ZERO is followed by another ZERO. After encoding, the serial output of the encoder/decoder 30 (which is phase-locked to the aforesaid clocks) is applied to a magnetic record/playback head 32 (via electronics 33) for recording on the disc 22. During data retrieval, the MFM encoded information is decoded by the encoder/decoder 30, and thereafter reconverted from serial to parallel form by the data sequencer 20.

The clocks which regulate the operation of the data sequencer 20, as aforesaid, relate to whether data is processed vis-a-vis disc Zone 0 or disc Zone 1. Since the boundary between the zones may, for sake of convenience, be defined by a given track number, the invention in this presently preferred form thereof decodes (24) the embedded track number servo information to signal the microprocessor 14 to provide one or the other of the desired clocks. Thus, "track number" determines whether there is to be Zone 0 or Zone 1 data processing.

The host computer 10, which forms no part of the present invention, maintains an index of data address locations . . . and their respective availability for, or the contents of, their data storage. Data supplied by the host computer 10 is, therefore, applied to the microprocessor 14 to enable the microprocessor 1. to decipher the head position desired by the host computer 10, 2. to compare the desired head position with the instantaneous head position, and 3. to effect head positioning, by means of a servo 25, in relation to such difference.

Figure 3B:
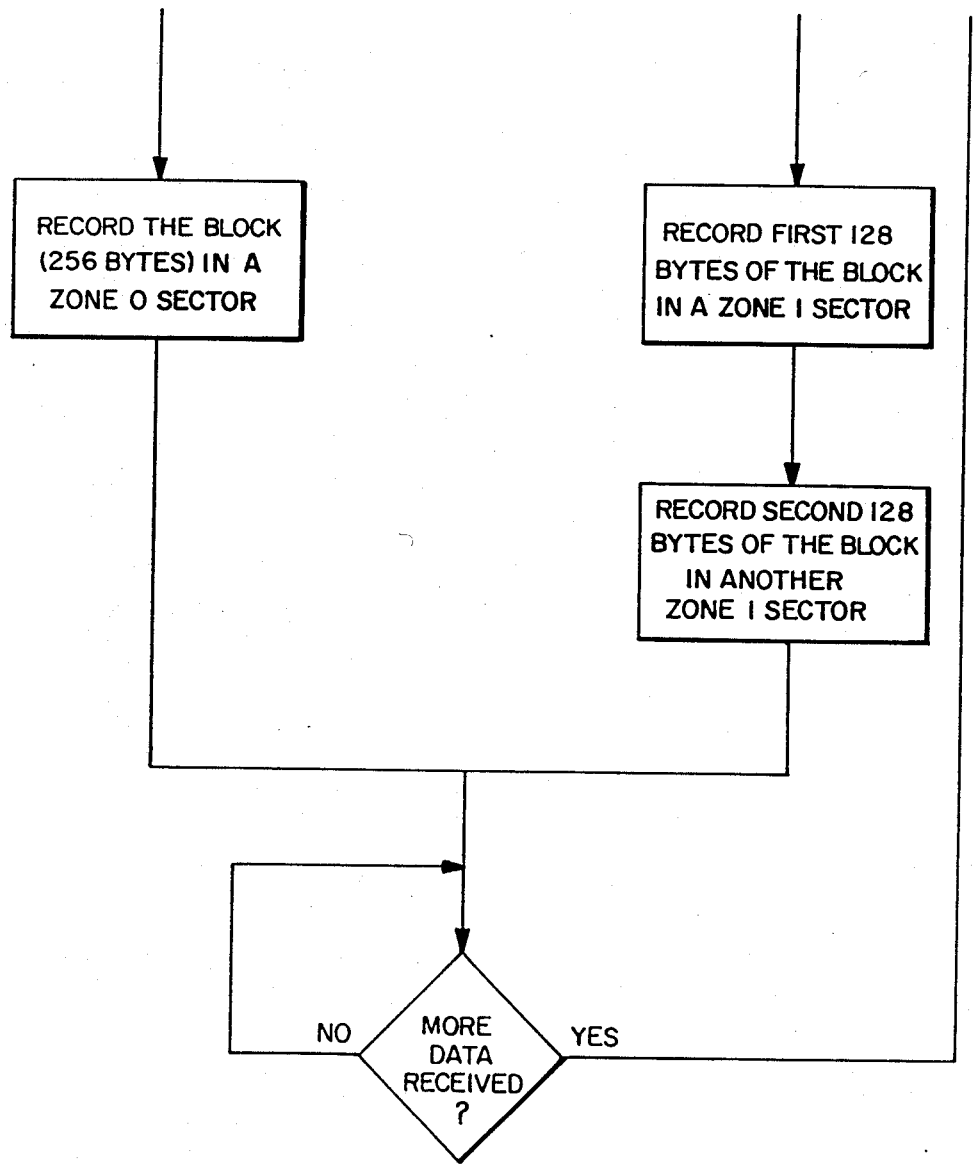

The aforementioned microprocessor algorithm is reflected in the flow diagram of FIGS. 3A, 3B: As indicated, data blocks of 256 bytes are transferred from the host computer 10 to the RAM 18. If the data calls for the algorithm to provide "Zone 0" processing, head positioning is implemented . . . with the flow of data being controlled by the Zone 0 clock for "full block" recording in a Zone 0 sector of the disc. In the event the data supplied by the host computer, however, calls, not for "Zone 0" processing, but rather for "Zone 1" processing, appropriate head positioning is implemented . . . with the flow of data now being controlled by the Zone 1 clock. Pursuant to the microprocessor algorithm, a "half-block" of data is recorded in a first Zone 1 sector, followed by the recording of the second "half-block" of data in a second Zone 1 sector.

Figure 4A:
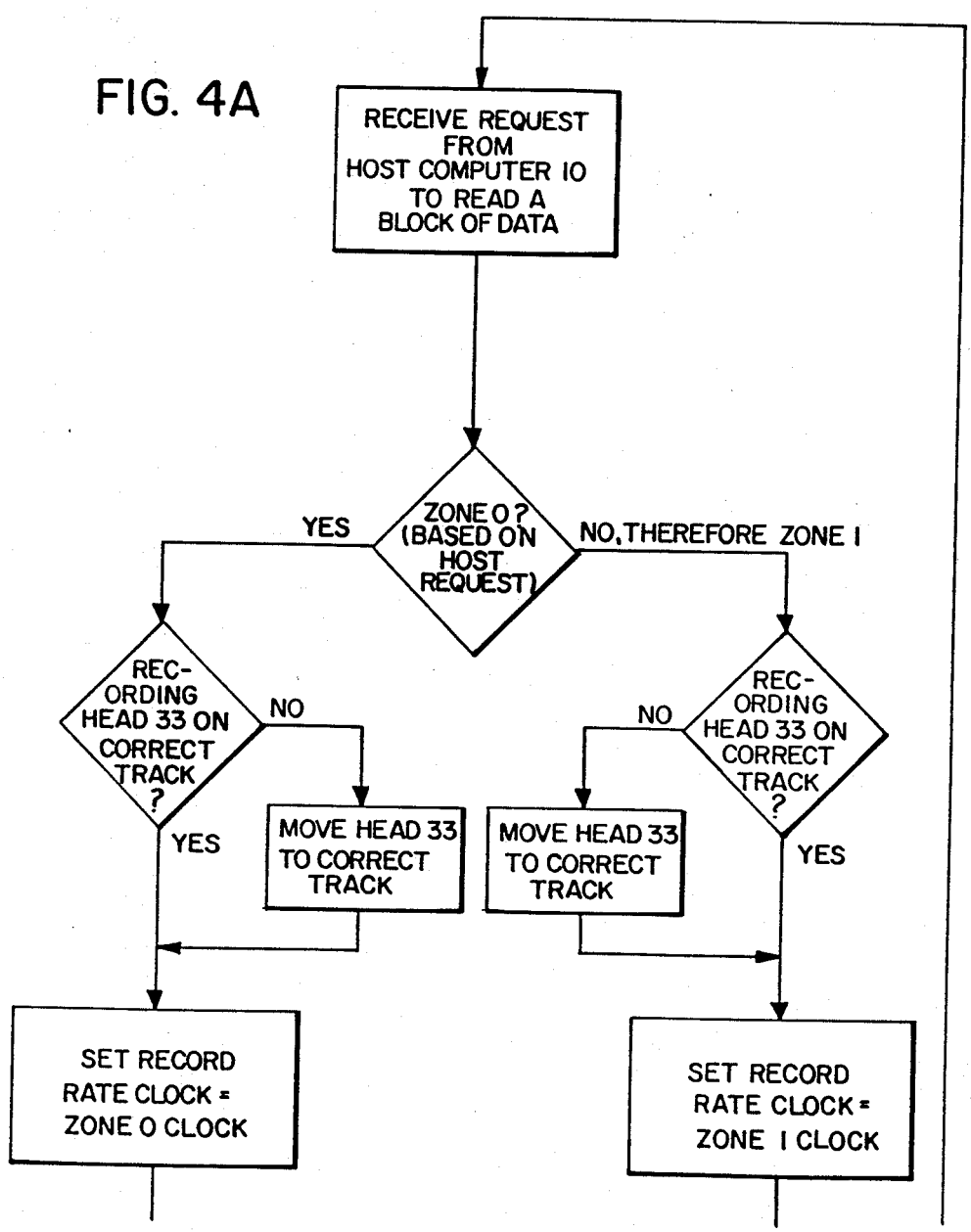
Figure 4B:
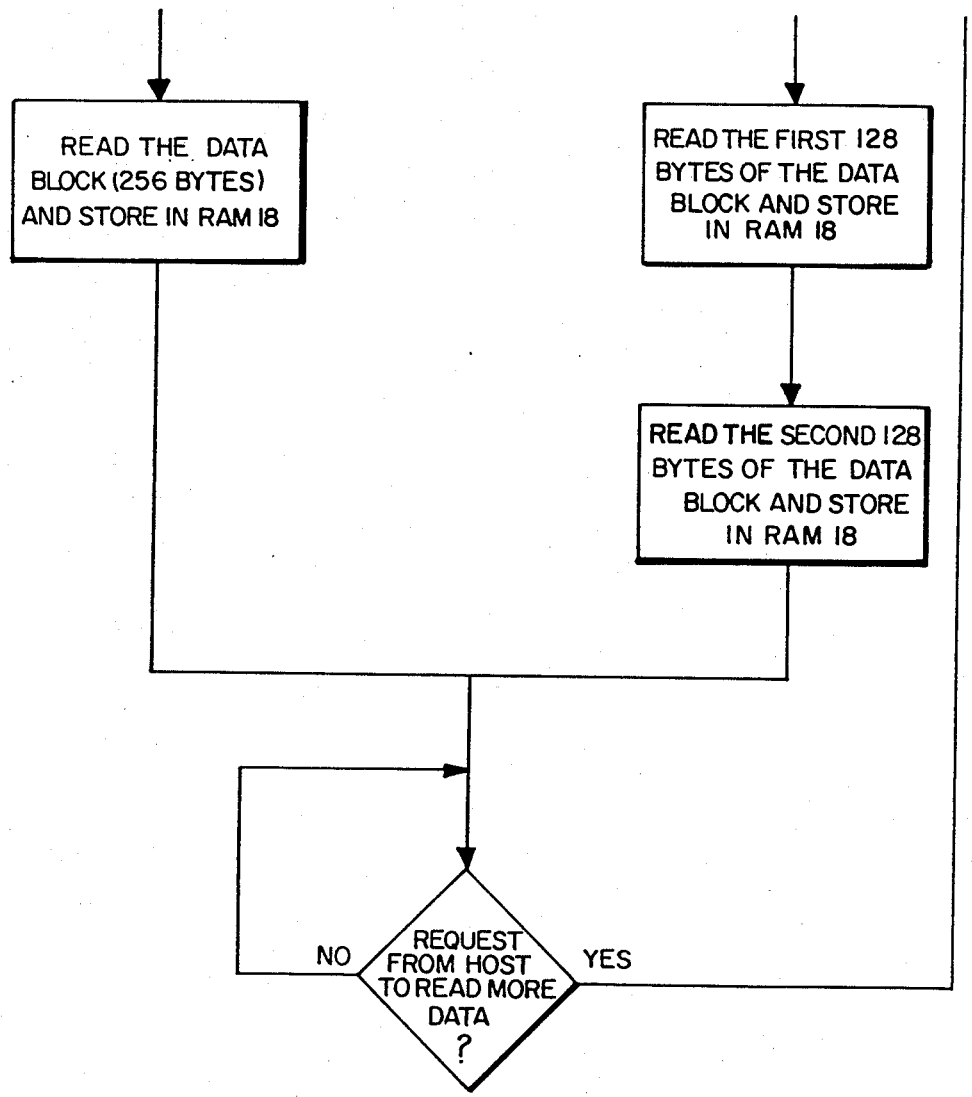

In a similar and analogous way, data is retrieved from the disc sectors (FIGS. 4A, 4B): The host computer 10 calls for data recorded in either Zone 0 or Zone 1 sectors, and depending on whether the request is for "Zone 0" or "Zone 1" processing, appropriate head (33) positioning is ordered . . . with the appropriate clocks being set depending on whether full- or half-blocks of data are read respectively from Zone 0 or Zone 1 tracks. As is always the case, full- and half-blocks of data are applied to the RAM 18, for eventual re-transmittal of full-blocks to the host computer 10.

The invention has been described in detail with particular reference to a presently preferred embodiment, but it will be understood that variations and modifications can be effected within the spirit and scope of the invention. For example, while the invention is cast in the environment of a 5¼" floppy disc, the invention is not so limited and may find applicability in connection with discs of different sizes, and with so-called hard discs as well. Further, while a two-zone structure, for a disc with two record sides, is depicted . . . while 256 bytes per data block are indicated . . . while each disc side employs 78 sectors per . . . such are all representative quantities, and serve merely to identify a presently preferred implementation of the invention.

What is claimed is:

1. For use with a computer disc having a format which is such that the data stored, or to be stored thereby, is arranged in generally pie-shaped sectors, said sectors being divided into at least two radially disposed recording zones for recording non-interleaved data in either said zone, each said zone having a respective number of tracks, the first zone being radially outward of the second zone, and the tracks of the first zone being adapted to record respective full blocks of data, said full blocks being respectively comprised of the same given number of data bytes, and the tracks of said second zone being respectively adapted to record half-blocks of data, said half-blocks being respectively comprised of half the number of data bytes which comprise said full blocks, apparatus comprising
  a. means for receiving data and disc storage address information from a host computer,
  b. microprocessor means
  c. a random access memory for use in controlling the flow of data from said host computer to said computer disc,
  d. magnetic head means, and
  e. means for controlling the positioning of said magnetic head means relative to said disc, said microprocessor means being connected to said means for receiving and said means for controlling head positioning for positioning said magnetic head means in accordance with said address information and, depending on whether recording is to be effected in a first or second zone of said disc, for causing data to be withdrawn from said random access memory in full or successive half blocks thereof, said apparatus further comprising means for providing first and second clocking signals corresponding respectively to the recording of full and half-blocks of data, said first clocking signal being different in frequency from said second clocking signal,
  said means for receiving data and disc storage address information receiving data bytes comprised of parallel arrangements of bits, and said apparatus further comprising means for receiving and converting the output of said random access memory to a serial bit format, said clocks being applied to said means for receiving and converting for operating that means selectively at the frequency of said first and second clocking signals.

2. The apparatus of claim 1 wherein the disc cooperative therewith is a floppy disc the sectors of which include pre-recorded track number information for indicating the tracks of said first and second zones, and the boundary between said zones.

3. The apparatus of claim 2 wherein said microprocessor means is means responsive to said pre-recorded track number information for the processing of data corresponding thereto.

* * * * *